Sept. 1, 1931.   N. E. LINDENBLAD   1,821,387
ANTENNA
Filed Oct. 28, 1927   2 Sheets-Sheet 1

INVENTOR
NILS E. LINDENBLAD
BY Ira J. Adams
ATTORNEY

Sept. 1, 1931.  N. E. LINDENBLAD  1,821,387
ANTENNA
Filed Oct. 28, 1927   2 Sheets-Sheet 2
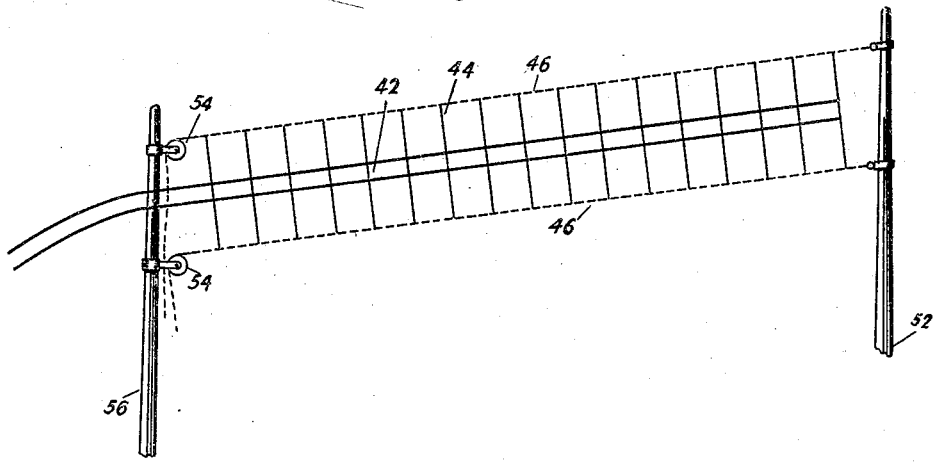
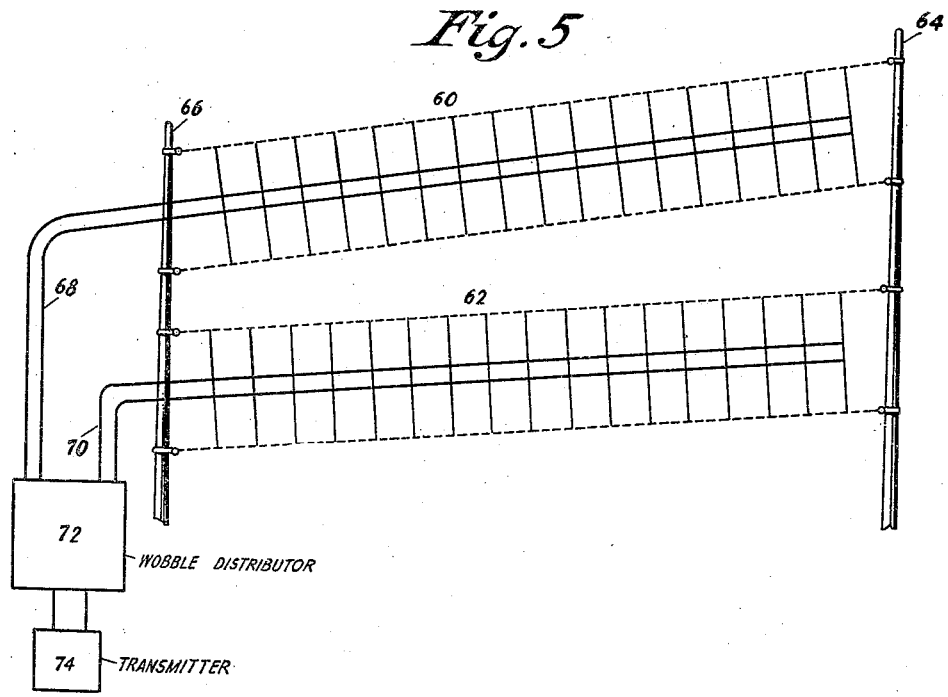
INVENTOR
NILS. E. LINDENBLAD
BY
ATTORNEY Patented Sept. 1, 1931

1,821,387

UNITED STATES PATENT OFFICE

NILS E. LINDENBLAD, OF ROCKY POINT, NEW YORK, ASSIGNOR TO RADIO CORPORATION OF AMERICA, A CORPORATION OF DELAWARE

ANTENNA

Application filed October 28, 1927. Serial No. 229,408.

This invention relates to antennæ, and more particularly to directive antennæ of the extensive type.

In a copending application of Clarence W. Hansell, Serial No. 161,771, filed Jan. 18, 1927, there is disclosed a directive antenna for short waves modeled somewhat after a wave antenna, but having a large number of transverse radiators coupled between longitudinal feeder members in order to increase the radiation. This antenna is of the end-on type.

There also has been suggested and put into use directive antennæ of the broadside type wherein a plurality of radiators are located normally of the direction of transmission, and are excited cophasially by means of a complex system of symmetrically branched feeder lines.

It is a primary object of my invention to improve such antennæ. The end-on antenna first mentioned is simple in structure, but I have improved it in operation. The broadside antenna next adverted to requires a complex structure which I have greatly simplified by exciting the transverse radiators by a pair of linear feeder members, much as in the case of the end-on antenna, but arranged to feed energy at apparent infinite velocity.

It is clear that for antennæ of the type under consideration there must be accurate control of the velocity of energy transfer along the feeder members, for this is what determines the relative phase relations in the individual radiators which make up the antenna. The velocity on a transmission line may be determined by adjustment of the relative inductance and capacitance characteristics of the line, but in the case of an antenna the situation is complicated by the existance of a powerful space wave of radiated energy which reacts upon the line. Therefore in order to be able to govern the velocity it is essential that the wave on the feeder members be not predominated over by the wave in space, and to attain this is one object of my invention, which I accomplish by placing the feeder members relatively closely together and coupling the radiators transversely and externally to the feeder members, rather than between them. In this way the radiation from the transversals does not have to cross the feeder members, and meanwhile the capacitance of the line relative to that of the radiators is increased.

The effect of the space wave on the feeder members is further reduced by reducing the amount of energy tapped from the feeder members by the individual radiators. This reduction of attenuation may be obtained in several ways, for example, by decreasing the length of the radiators, so as to decrease their capacitance, or by decreasing the spacing and increasing the size of the feeder members in order to increase their capacitance, or by using limiting reactances, preferably small condensers, in series with the radiators, or even, though less desirably, by increasing the spacing between successive radiators.

To control the velocity along the feeder members I employ transverse inductances which are internally coupled to the feeder members. Now the action of the feeder members may be further complicated by the fact that tapping energy from them by the radiators serves to upset their smooth and uniform operation as a transmission line. In some cases each of the tapping points may act as a reflection point. To overcome this is a further object of my invention which I fulfill by employing, where necessary, a greater number of transverse velocity control inductances than there are transverse radiators.

For a desired degree of directivity there is a minimum length of extensive antenna system. In the case of the end-on antenna it is desirable that the attenuation or rate of withdrawal of energy from the feeder members be such that the energy therein is brought to zero at the end of the antenna. If the attenuation is too small there is energy left over at the end of the line which, unless absorbed, is reflected and causes standing waves, with attendant energy losses. In fact, reflected energy is energy transmitted in the opposite direction, which, of course, spoils the radiation pattern of the antenna, and is wasted. If the attenuation is too great the energy radiated by the first portion of the antenna induces energy back into the latter portion of the antenna and standing waves may result. In any event, when the attenuation is too great only the first portion of the antenna is effective, and therefore the requirement of minimum length of extensive system is no longer fulfilled. It is therefore clear that accurate control of attenuation, as well as of velocity, is required, and to meet this requirement is a further object of my invention. For this the expedients already suggested for limiting the withdrawal of energy by the radiators are perfectly suited, inasmuch as the natural rate of attenuation, in general, is too great.

In the case of the end-on antenna there is exceedingly sharp directivity not only in azimuth but also in elevation. This is desirable because it is economical of energy, but it leads to the disadvantage that the wave, if transmitted horizontally, lacks elevated components, which may reduce the distance of communication. It is a still further object of my invention to overcome this difficulty, which I do by pointing the antenna upwards, that is, I position the successive radiators on a line which points toward the receiver, in azimuth, and above the horizontal, in elevation.

This is helpful but not a certain solution of the difficulty, for the space wave obtained is sharply directively transmitted and may not strike a favorable reflection or refraction portion of the Heaviside layer. To improve this condition I employ a plurality of end-on antennæ having differing directivities in elevation, and I energize these successively and cyclically in order to wobble the transmitted beam in elevation.

My invention is further described and further claimed in my copending companion application, Serial Number 229,407, filed on even date herewith, and in the following specification, which is accompanied by drawings in which Figure 1 is a fragment and explanatory of one form of antenna;

Figure 4 indicates an elevated end-on antenna; and

Figure 5 represents an arrangement for directivity wobble in elevation.

Figure 1:
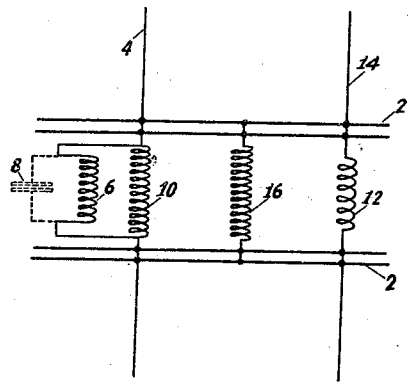

Referring to Figure 1 it is seen that the feeder members 2 are located relatively closely together, and that the radiators 4 and 14 are coupled transversely and externally to the feeder members, rather than between them. This change is exceedingly important for it results in that the radiation from the transversals does not have to cross and interlink with the feeder members. It also results in that because the feeder members are close together the region between them contains potential and magnetic lines of force which are normal, rather than curved, as seems to be the case when the feeder members are far apart, owing to the lag caused by the lower velocity of the lines of force in space. It also increases the capacitance of the feeder members, thereby helping the energy therein to predominate over the space wave.

To further increase the capacitance and decrease the surge impedance of the feeder members they may be enlarged in cross section, or several conductors may be used in parallel, as has been indicated in Figure 1. This procedure is beneficial, and if carried sufficiently far, may alone be used to obtain feed line domination and successful velocity control. However, to solve the problem entirely by this expedient is structurally inconvenient and expensive, and it is much better to use a transmission line of more ordinary dimensions, and to limit the attenuation by other means.

In Figure 1 the radiators 4 and 14 have been shortened, physically, thus reducing their capacitance and their relative energy withdrawal. They may be considered as having been lengthened electrically so as to again bring them in tune by a fictitious inductance 6, which resonates with the natural capacitance of the radiator 8.

For velocity control transverse inductances are used. The velocity-reactance curve is similar to a curve of tangents, and, in the range in which I choose to work, a larger inductance connected across the line causes a smaller resultant velocity. A total absence of transverse connection is a case of infinite inductance, and therefore low velocity. To increase the velocity transverse inductances of finite size are connected across the line, and these may be decreased or increased in magnitude according as it is desired to increase or decrease the apparent velocity of energy flow on the line. By suitably choosing the inductances the velocity may be increased to apparent infinite velocity. The word "apparent" is inserted because it is impossible to really cause energy to flow along a line at an infinite velocity, in the transient state, but it is possible to have all parts of the line fluctuating cophasially immediately after the transient state, which is apparent infinite velocity. Because of the nature of a curve of tangents, if the inductance is further decreased the velocity swings from infinity in one algebraic sense to infinity in the opposite algebraic sense, and thereafter becomes finite in decreasing values. This is pointed out because it explains why the adjustment for actually infinite velocity is more critical than the adjustment for light velocity, as in an end-on antenna. In fact, an end-on type of antenna may be successfully used over a moderate band of transmission frequencies.

In Figure 1 the fictitious inductance 10 may be considered a velocity control inductance of proper magnitude to produce the desired velocity in the feeder members. It is clear that the fictitious parallel inductances 6 and 10 may be replaced by an equivalent inductance of lower reactance, such as the inductance 12 shown in series with radiator 14. The radiator 14, loaded by the inductance 12, is apparently detuned with respect to the transmission frequency.

The inductance 16 is a velocity control inductance located intermediate the radiators 4 and 14, and serves to improve the action of the feeder members as a transmission line, especially in cases where the radiators are spaced at relatively greater intervals.

Figure 2:
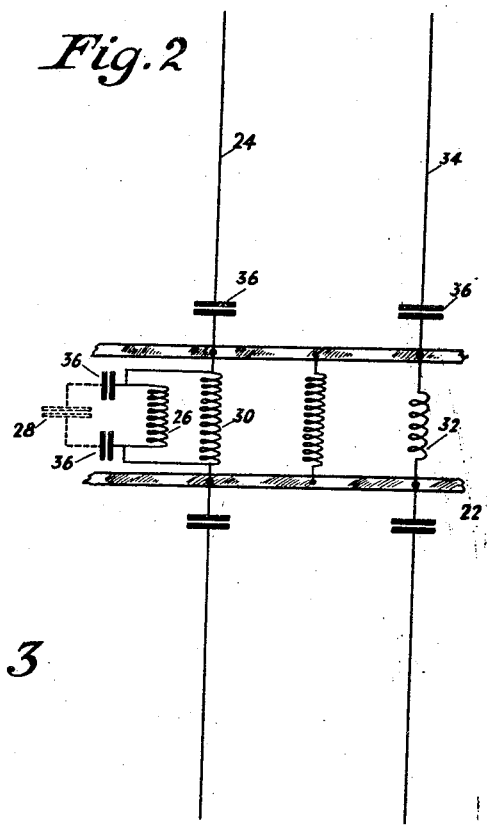
Figure 2 is a fragment and explanatory of another form of antenna.

Attention is now directed to Figure 2, in which there are feeder members 22, which may take the form of a copper strip, to which there are coupled transverse radiators 24 and 34, through small series condensers 36. The equivalent circuit consists of a fictitious tuning inductance 26, the natural capacitance of the radiators 28, and the series condensers 36. The reactance of the capacitive branch is governed mostly by that of the small series condensers. By coupling through these limiting reactances the capitance of the radiators is lowered, and therefore they need not be physically decreased in length, and preferably may be increased. Decreasing the capitance of the radiators by shortening them lessens their radiation resistance. By the expedient adopted in Figure 2 the radiation resistance not only need not be decreased but actually may be increased, and meanwhile the capacitance may be made any value desired. Increased radiation resistance, from a simpler aspect, means merely that the transversal is more efficiently a radiator, which might be predicted from its greater length.

As in Figure 1 there is a fictitious velocity control inductance 30, and the parallel inductances 26 and 30 may be replaced by a single inductance 32. Also, if desired, additional velocity control inductances may be used.

Figure 3:
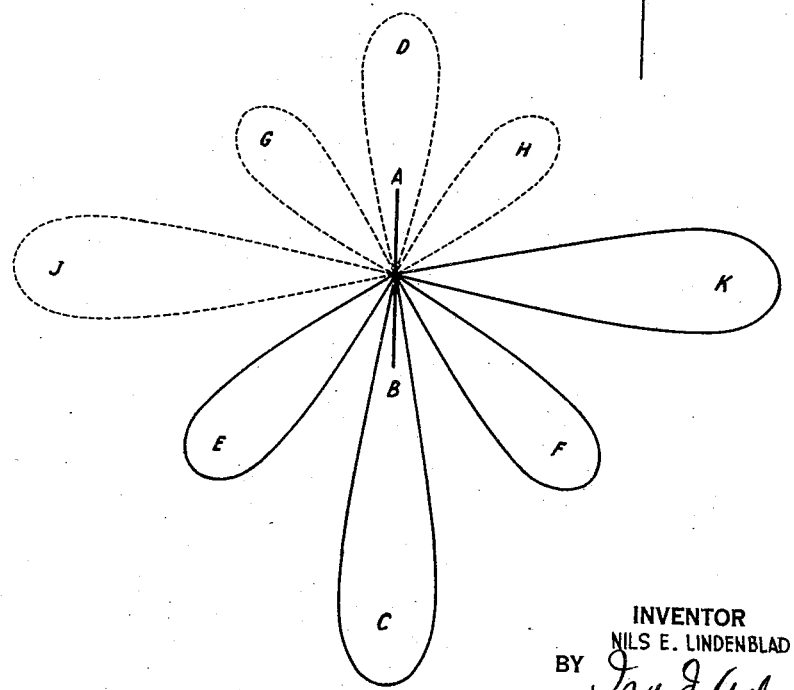
Figure 3 is a radiation pattern.

It is to be understood that the various features so far pointed out are equally applicable to end-on and broadside antenna systems. In its most general aspect my invention makes these systems alike, at least, in fundamentals. To explain this more clearly attention is directed to Figure 3, in which an extensive antenna system is indicated by the line AB. It is known that if the radiators along the antenna AB are excited cophasially they radiate normally of the antenna, whereas if they are excited at phase displacements equal to those of the wave in space the antenna propagates energy along its length, and if the radiators are excited at phase displacements greater than those of the wave in space the antenna propagates energy in intermediate directions.

I excite the radiators from simple linear feeder members, and I obtain the desired phase displacements by causing the energy flow on the feeder members to dominate the space wave and by then controlling the velocity of energy flow along the feeder members to be that desired. It is clear that for end-on propogation the velocity should be that of light, for broadside propagation the velocity should be infinite, and for intermediate directions the velocity should be intermediate infinite velocity and that of light.

When feeding energy along the antenna in the direction from A to B at the velocity of light a radiation pattern is produced like that marked C. If the attenuation along the antenna is too small energy is left over at the end B, and is reflected, producing radiation in the opposite direction, marked D. There is no radiation at right angles because the standing wave produced by reflection, like the travelling wave before reflection, has successive portions along the antenna AB of opposite phase which neutralize one another.

If the velocity of flow along the feeder members from A to B is increased the radiation pattern C splits up into the patterns E and F, and reflection will cause additional lobes G and H.

If the velocity is made infinite the radiation patterns are J and K, which are equal. The reason for this is that apparent infinite velocity is produced by causing a standing wave of infinite length. To maintain the steady state full reflection and little attenuation are desired. In broadside propagation the lobe K is the merger of the lobes F and H, and therefore reflection is not at all undesirable. For unidirective propagation additional antennæ may be used to oppose and reflect the lobe J.

End-on propagation may be made unidirective by reducing the antenna energy to zero at its end B to prevent reflection, which requires attenuation control. This expedient is not suitable for a broadside antenna, yet with it, as well as with the end-on antenna, there must be attenuation control because the energy withdrawn by the individual radiators must be limited, lest the space wave adversely affect the wave on the feeder members.

In Figure 4 there is indicated an end-on antenna comprising feeder members 42 which excite transverse radiators 44 supported between supporting lines 46. For the sake of simplicity the series reactances have been omitted. The lines 46 are attached at one end to a mast 52. The other ends of the lines 46 are passed over pulleys 54 attached at a different altitude to a mast 56. With this arrangement the successive radiators are positioned on a line which points toward the receiver, in azimuth, and above horizontal a desired amount, in elevation.

In Figure 5 there are shown two complete end-on antennæ 60 and which are supported between masts 54 and 56 at differing angles in elevation. The antennæ are fed by transmission lines 68 and 70, which lead to a distributor means 72, to which transmission energy is fed from a source 74. The distributor serves to supply the energy to the antennæ successively and cyclically, so that the directivity in elevation is wobbled. For a more detailed description of a distributor suitable for wobbling reference is made to my copending application, Serial No. 213,566 filed August 17, 1927.

The end-on antennæ may be suspended so that the transverse radiators are either vertical, horizontal, or biased. For wobbled transmission more than two antennæ may be employed.

I claim:

1. Apparatus for propagating high frequency energy which comprises a plurality of spaced radiators spaced in a phase relationship when energized substantially equal to that of a wave in space, and positioned so that the successive radiators are on a line which points towards the receiver, in azimuth, and above the horizontal, in elevation.

2. An end-on extensive antenna system comprising relatively closely spaced feeder members extending in the direction of transmission, and a plurality of radiators transversely and externally coupled thereto, said feeder members being linear throughout their length.

3. An end-on extensive antenna system comprising relatively closely spaced feeder members of relatively large cross section extending in the direction of transmission, and a plurality of radiators transversely and externally coupled thereto.

4. An end-on extensive antenna system comprising relatively closely spaced feeder members of low surge impedance extending in the direction of transmission, and a plurality of radiators of low capacitance transversely and externally coupled thereto.

5. An end-on extensive antenna system comprising feeder members extending in the direction of transmission, and a plurality of radiators transversely and externally coupled thereto through limiting series reactances.

6. An end-on extensive antenna system comprising feeder members extending in the direction of transmission and a plurality of radiators transversely and externally coupled thereto through small series condensers.

7. An end-one extensive antenna system comprising feeder members extending in the direction of transmission, a plurality of radiators transversely and externally coupled thereto, and a plurality of velocity control inductances transversely and internally coupled thereto.

8. An end-on extensive antenna system comprising feeder members extending in the direction of transmission, a plurality of radiators transversely and externally coupled thereto, and a greater number of velocity control inductances transversely and internally coupled thereto.

9. An end-on extensive antenna system comprising feeder members extending in the direction of transmission, a plurality of radiators transversely and externally coupled thereto, and inductances internally coupled thereto in series with said radiators, said inductances being equivalent in magnitude to two parallel inductances which respectively tune the radiators and control the velocity of energy transfer along the feeder members.

10. An end-on extensive antenna system comprising feeder members extending in the direction of transmission, a plurality of radiators transversely and externally coupled thereto, and a plurality of velocity control and tuning inductances transversely and internally coupled thereto.

11. An end-on extensive antenna system comprising feeder members extending in the direction of transmission, in azimuth, and above horizontal, in elevation, a plurality of radiators transversely and externally coupled thereto, and a plurality of velocity control and tuning inductances transversely and internally coupled thereto.

12. In the operation of an end-on extensive antenna comprising linear feeder members extending in the direction of transmission and transverse radiators coupled thereto, the method which includes the step of conducting a relatively increased amount of energy through the feeder members, and absorbing a relatively decreased amount of energy in each radiator, so as to cause the energy wave in the feeder members to predominate over the space wave traversing the antenna.

13. An extensive transmitting antenna system comprising feeder members and a plurality of radiators transversely and externally coupled thereto through series condensers, said feeder members being conductive and linear throughout their length.

14. A directive antenna system for propagating electromagnetic wave energy comprising a pair of closely spaced conductors substantially linear throughout their length, a plurality of radiators parallel to each other arranged in one plane, a condenser in series with each of said radiators for coupling each of the radiators to one of said conductors; another plurality of radiators each of the radiators of said second plurality being parallel to each other and arranged in the same plane as the plane of said first mentioned plurality of radiators, and a condenser in series with each of the radiators of said last mentioned plurality of radiators for coupling each of said last mentioned plurality of radiators to said other linear conductor.

NILS E. LINDENBLAD.